(12) United States Patent
Bellamkonda

(10) Patent No.: US 9,535,956 B2
(45) Date of Patent: Jan. 3, 2017

(54) EFFICIENT SET OPERATION EXECUTION USING A SINGLE GROUP-BY OPERATION

(71) Applicant: Oracle International Corporation, Redwood Shores, CA (US)

(72) Inventor: Srikanth Bellamkonda, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 14/170,392

(22) Filed: Jan. 31, 2014

(65) Prior Publication Data

US 2015/0220600 A1 Aug. 6, 2015

(51) Int. Cl.
*G06F 17/30* (2006.01)

(52) U.S. Cl.
CPC ... *G06F 17/30498* (2013.01); *G06F 17/30424* (2013.01); *G06F 17/3033* (2013.01); *G06F 17/30489* (2013.01); *G06F 17/30516* (2013.01)

(58) Field of Classification Search
CPC .................. Y10S 707/99931; G06F 17/30489; G06F 17/30498; G06F 17/30516; G06F 17/3033
USPC ........................................................ 707/747
See application file for complete search history.

(56) References Cited

U.S. PATENT DOCUMENTS

| | | | |
|---|---|---|---|
| 6,134,546 A * | 10/2000 | Bestgen | G06F 17/30498 |
| 6,230,151 B1 * | 5/2001 | Agrawal | G06F 8/453 706/12 |
| 6,480,858 B1 * | 11/2002 | Boa | G06F 17/30949 707/713 |
| 6,633,885 B1 * | 10/2003 | Agrawal | G06F 17/30864 |
| 7,631,074 B1 * | 12/2009 | Srivastava | G06F 17/30489 709/224 |
| 9,104,678 B1 * | 8/2015 | Nemes | G06F 17/30132 |
| 2004/0172400 A1 * | 9/2004 | Zarom | G06F 17/30982 |
| 2006/0116989 A1 * | 6/2006 | Bellamkonda | G06F 17/30489 |
| 2007/0073643 A1 * | 3/2007 | Ghosh | G06F 17/30463 |
| 2009/0012957 A1 * | 1/2009 | Villaret | G06F 7/02 |
| 2009/0119247 A1 * | 5/2009 | Bellamkonda | G06F 17/30498 |
| 2010/0005054 A1 * | 1/2010 | Smith | G06F 17/30498 707/E17.002 |
| 2013/0013585 A1 * | 1/2013 | Graefe | G06F 17/30498 707/714 |
| 2013/0332434 A1 * | 12/2013 | Sompolski | G06F 17/30466 707/701 |
| 2014/0156636 A1 * | 6/2014 | Bellamkonda | G06F 17/30489 707/718 |
| 2015/0220600 A1 * | 8/2015 | Bellamkonda | G06F 17/30498 707/747 |

* cited by examiner

*Primary Examiner* — Thanh-Ha Dang
(74) *Attorney, Agent, or Firm* — Hickman Palermo Becker Bingham LLP; Marcel K. Bingham

(57) ABSTRACT

Techniques are described herein for efficient set operation execution. According to some embodiments, a request is received to perform a set operation with respect to a first data set and a second data set. The request may identify the first data set, the second data set, and a type of set operation to perform. In response to receiving the request, a hash table is generated in memory from a first set of records in the first data set, and a second set of records from the second data set is probed against the hash table. Based on probing the hash table and the type of set operation identified in the request, records that satisfy the set operation are identified and output from the hash table.

20 Claims, 9 Drawing Sheets

| T1 | |
|---|---|
| a | b |
| $a_1$ | $b_1$ |
| $a_1$ | $b_1$ |
| $a_2$ | $b_2$ |
| $a_2$ | $b_2$ |
| $a_2$ | $b_2$ |
| $a_1$ | $b_1$ |

| T2 | |
|---|---|
| a | b |
| $a_1$ | $b_1$ |
| $a_3$ | $b_3$ |
| $a_1$ | $b_1$ |
| $a_1$ | $b_2$ |

T1 INTERSECT T2

102 ~
| a | b |
|---|---|
| $a_1$ | $b_1$ |

T1 INTERSECT ALL T2

104 ~
| a | b |
|---|---|
| $a_1$ | $b_1$ |
| $a_1$ | $b_1$ |

T1 MINUS T2

106 ~
| a | b |
|---|---|
| $a_2$ | $b_2$ |

T1 MINUS ALL T2

108 ~
| a | b |
|---|---|
| $a_1$ | $b_1$ |
| $a_2$ | $b_2$ |
| $a_2$ | $b_2$ |
| $a_2$ | $b_2$ |
| $a_1$ | $b_1$ |

T1 UNION T2

EFFICIENT SET OPERATION EXECUTION USING A SINGLE GROUP-BY OPERATION

FIELD OF THE DISCLOSURE

The present disclosure relates to database operations, generally, and, more specifically, to techniques for executing structured query language (SQL) SET operations.

BACKGROUND

SQL SET operations are used in queries to find differences (minus), commonalities (intersect), and combinations (union) between multisets of database records. With the minus SET operation, for example, the result set includes unique database records returned by a first SQL SELECT statement that are not returned in a second SQL SELECT statement. Thus, the SQL statement illustrated in Table 1 below outputs records that have a unique product_id in t1 that is not included in t2.

TABLE 1

Example query with MINUS operator

SELECT product_id FROM t1
MINUS
SELECT product_id FROM t2

By contrast, the intersect SET operation generates a result set including unique database records returned by both the first SQL SELECT statement and the second SQL SELECT statement. Thus, the SQL statement illustrated in Table 2 below outputs records that have a product_id that is included in both t1 and t2.

TABLE 2

Example query with INTERSECT operator

SELECT product_id FROM t1
INTERSECT
SELECT product_id FROM t2

One approach for evaluating set operations involves using a "unique" operator in the first phase followed by a "combine" operator in the second phase. The "unique" operator sorts and compares records within a data set to identify and remove duplicates. The "combine" operator then performs the MINUS, INTERSECT, or UNION operation. In the queries depicted in Table 1 and Table 2, for example, the first phase would involve performing a "unique" operation on t1 and performing a "unique" operation on t2. The second phase for the queries depicted in Table 1 and Table 2 would involve performing a MINUS and INTERSECT operation, respectively, on the results from the first phase. This approach provides a simple and straightforward way to evaluate set operations. However, this approach may involve multiple resource-intensive steps, with each phase sorting and/or comparing records from potentially large data sets.

Another approach for evaluating set operations comprises performing a "join" of the multisets, followed with the "unique" operation. For the MINUS operation depicted in Table 1, an anti-join is performed to join t1 and t2 to generate a table that includes only those records from t1 for which there is no record in t2 that has an equal product_id value. For the INTERSECT operation depicted in Table 2, a semi-join is performed to generate a table that includes only those records from t1 for which there is a record in t2 that has a matching product_id value. The "unique" operation is then performed to remove duplicate records from the result set generated by the "join" operation. This approach may reduce resources consumed by the "unique" operator if the result set of the "join" operation is small. However, when the "join" operation produces a large data set, this approach may be more resource-intensive than performing the "unique" operation on each individual data set. For example, removing duplicates from a large table generated by the join operation may, in some cases, involve more comparisons than removing duplicates from each individual table before the join, especially when there are a large number of duplicates. In addition, the "join" operator and the "unique" operators are also relatively expensive in terms of CPU and memory usage, with each phase sorting and/or comparing records from potentially large data sets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which:

FIG. 1 is a diagram depicting different result sets for different respective set operations, according to an embodiment;

DETAILED DESCRIPTION

Figure 2:
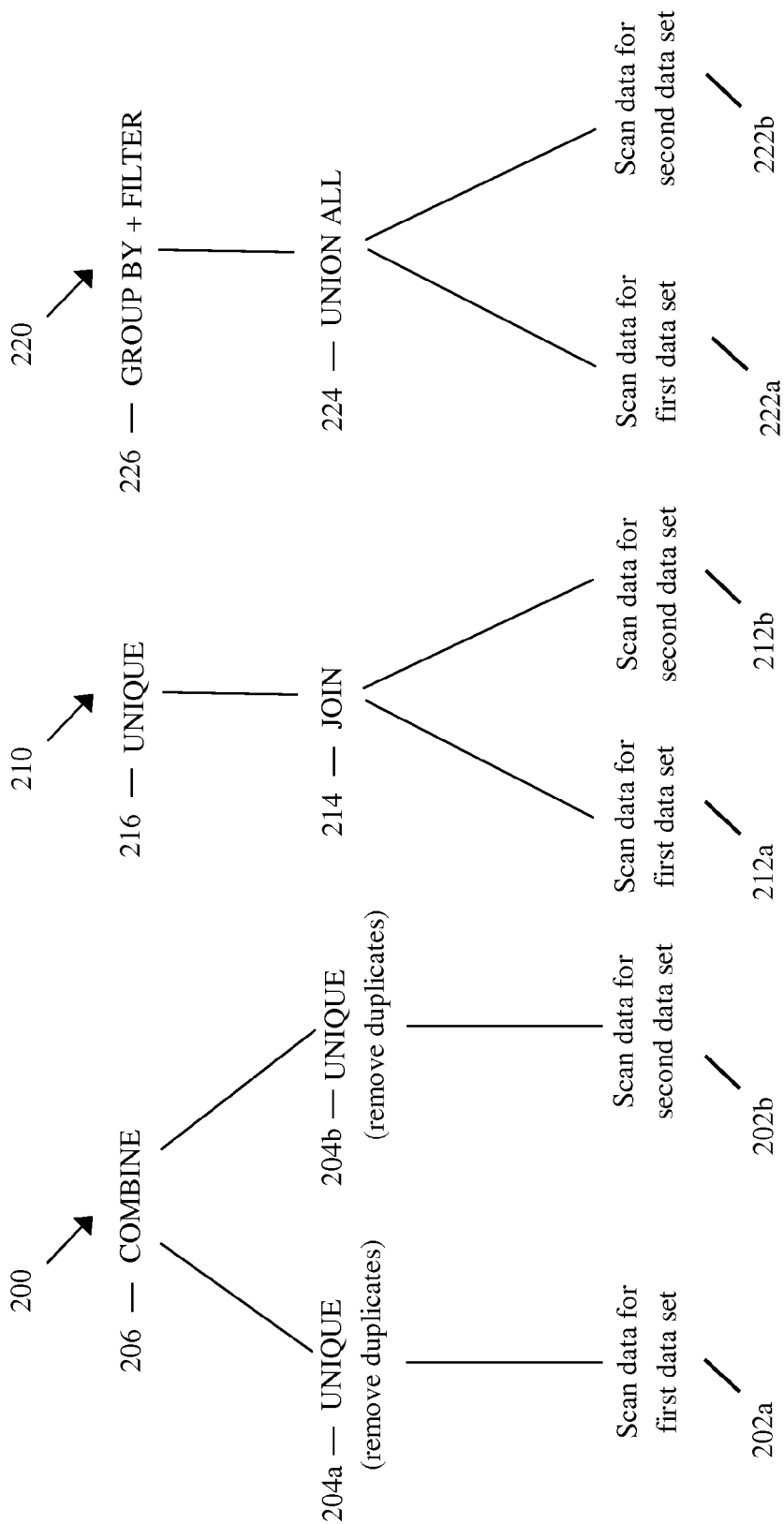
FIG. 2 is a diagram depicting example query execution plans for performing a set operation, according to an embodiment.

Techniques are described herein for efficient set operation execution using a single group-by operation. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, set operations may be evaluated using a single group-by operation. The group-by operation may be hash-based, such that when a request to perform a set operation with respect to a first data set and second data set is received, a hash table is generated in memory from records in the first data set identified in the request. Records from the second data set are then probed against the hash table and, based on the type of set operation identified in the request, matching rows are removed or output in a final result set for the set operation. Thus, the set operation may be evaluated in a single phase, which may significantly reduce the amount of resources consumed during execution and increase the speed at which result records are output.

In other embodiments, markers may be used to differentiate records from different data sets. When a request is received to perform a set operation with respect to a first data set and a second data set, a first marker may be added to each record in the first data set, and a second marker may be added to each record in the second data set. The marker may be a column that stores a value identifying the data set to which a particular record belongs. During execution of the set operation, the markers may be used to determine which rows to keep and which rows to remove from the hash table. For example, the markers may be used to determine whether matching rows belong to the same data set or to different data sets.

In other embodiments, count values may be aggregated and used to track how many duplicates belong to each data set. In order to track duplicates, a first and second count value may be added to records in the hash table. The first count value is aggregated based on how many duplicates of the respective record exist in the first set of records. The second count value is aggregated based on how many duplicates of the respective record exist in the second set of records. The first and second count values may be used to determine which rows to remove and which rows to output in the final result set.

In other embodiments, the hash table may be partitioned to allow for more efficient execution for out-of-memory scenarios where records are spilled to disk. In such scenarios, a first set of one or more partitions may be stored in memory, while a second set of one or more partitions may be stored on disk. Metadata may be maintained in a group-by data structure to find boundaries between the first data set and second data set.

Example Set Operation Requests

A request to perform a set operation may comprise any data that identifies a type of set operation to perform and the data sets involved in the set operation. In example embodiments provided herein, the request is a database command that explicitly specifies the type of set operation to perform and the set of one or more keys. However, the techniques are not limited to database commands and may also be applied to other types of requests, such as web search requests.

Table 1 and Table 2 above depict example database commands for performing set operations. The data sets involved in the set operation correspond to the result sets of different queries. The first data set is identified by the query SELECT product_id FROM t1, which retrieves a data set comprising records from the product_id column of table t1. The second data set is identified by the query SELECT product_id FROM t2, which retrieves a data set comprising records from the product_id column of table t2. In other embodiments, data sets may be selected from multiple columns of a table and/or based on filter conditions. For example, the query depicted in Table 3 below identifies two data sets using SELECT statements with a WHERE clause for filtering. The first data set comprises records from the client_id and client_name column of t1 where the client_id is less than 5000, and the second data set comprises records from the company_id and company_name column of t2 where the company_id is greater than 1000.

TABLE 3

Example query with INTERSECT operator and filter conditions for defining data sets SELECT client_id, client_name FROM t1
WHERE client_id <5000
INTERSECT
SELECT company_id, company_name FROM t2;
WHERE company_id > 1000

In other embodiments, other identification data may be used to identify data sets involved in the set operations. For example, the request may specify names for the different data sets rather than a SELECT statements defining each data set.

The types of set operations that may be requested may vary from implementation to implementation. Example types of set operations may include, without limitation, INTERSECT operations, INTERSECT ALL operations, MINUS operations, MINUS ALL OPERATIONS and UNION operations. FIG. 1 is a diagram depicting different result sets for different respective set operations performed with respect to a first data set and a second data set, according to an embodiment. The INTERSECT operation finds records that are unique and common to the different data sets, and outputs these records in final result set 102. The INTERSECT ALL operation also finds common records but does not remove duplicate records from the final result set, outputting final result set 104. The MINUS operation finds differences between the data sets, and outputs final result set 106, which includes records that are found in one data set but not the other data set. The MINUS ALL operation is similar to the MINUS operation, but keeps duplicate records that are not found in the other data set, resulting in final result set 108 The UNION operation combines records from the different data sets and eliminates any duplicates, resulting in final result set 110.

Single-Phase Query Execution Plan for a Set Operation

In some embodiments, a query execution plan may be generated in response to receiving a request to perform a set operation, where the query execution plan includes an ordered set of steps for performing the set operation. The query execution plan may be generated by a query optimizer of a database management system (DBMS) or some other process or set of processes executing on a computing system.

FIG. 2 is a diagram depicting example query execution plans for performing a set operation, according to an embodiment. Query execution plans 200 and 210 involve multiple phases of performing sorts and/or comparisons of records, which may be relatively resource intensive for large sets of data. By contrast, query execution plan 220 includes group-by operator 226, which is the only operator in query execution plan 220 that performs a comparison of records from the first data set and second data set before the final result set for the set operation is output.

In query plan 200, scan operator 202a scans rows from the first data set, and scan operator 202b scans rows from the second data set into memory. Unique operator 204a takes a set of rows from the first data set as input, sorts the rows, compares the rows to remove duplicates, and outputs unique rows. Unique operator 204b performs the same operations for the second data set. Compare operator 206 receives rows from unique operator 204a and unique operator 204b in sorted order as input. Compare operator 206 then compares rows to identify matches in the different data sets. Matching rows are returned for INTERSECT and non-matching rows from the first data set are returned for MINUS.

In query plan 210, scan operator 212a scans rows from the first data set into memory, and scan operator 212b scans rows from the second data set into memory. Join operator 214 joins the rows from the first and second data set as output by scan operators 212a and 212b into a single data set. The join operation involves sorting and comparing records to identify matches between records from the first data set and the second data set. Alternatively, a hash-based join may be used to join records of the first data set. An anti-join may be performed for a MINUS operation to remove matching records, or a semi-join may be performed for an INTERSECT operation to keep matching records. The rows output by join operator 214 serve as input to unique operator 216, which compares records to remove duplicates. The final result set for the set operation is then output by unique operator 216.

In query plan 220, scan operator 222a scans rows from the first data set, and scan operator 222b scans rows from the second data set. UNION ALL operator 224 outputs all rows received from scan operator 222a and scan operator 222b. UNION ALL operator 224 does not eliminate duplicate rows. Thus, no sorting or comparison is performed by UNION ALL operator 224. Group-by operator 226 groups rows by one or more columns and applies a filter based on the type of set operation requested. For an INTERSECT operation, group-by operator 226 generates a final result set by removing rows that do not have a match between data sets while keeping rows that are included in both data sets. For a MINUS operation, group-by operator 226 generates a final result set by removing rows from the first data set that match with one or more rows in the second data set and returning the remaining rows of the first data set as the final result set. Group-by operator 226 may further perform aggregation of marker and/or count values for each group to identify rows that should be kept and rows that should be removed. Techniques for using group-by operator 226 to perform set operations are described in further detail below.

Set Operation Execution Using Hash-Based Group by Operators

In some embodiments, group-by operator 226 may be executed using a hash algorithm rather than performing sort-based comparisons of the records. A hash-based group-by operation applies a hash function to grouping keys in order to group records within a hash table. In the examples provided herein, the grouping keys are the columns with respect to which the set operation is performed. For the queries depicted in Table 1 and Table 2, for example, the grouping key is the product_id column. For the query depicted in Table 3, the grouping keys are the client_id and client_name columns for the first data set, and the company_id and company_name for the second data set. The hash-based group-by operation generates a result set without performing a sort of the first data set and second data set, which may minimize the number of record comparisons performed and improve execution time.

Figure 3:
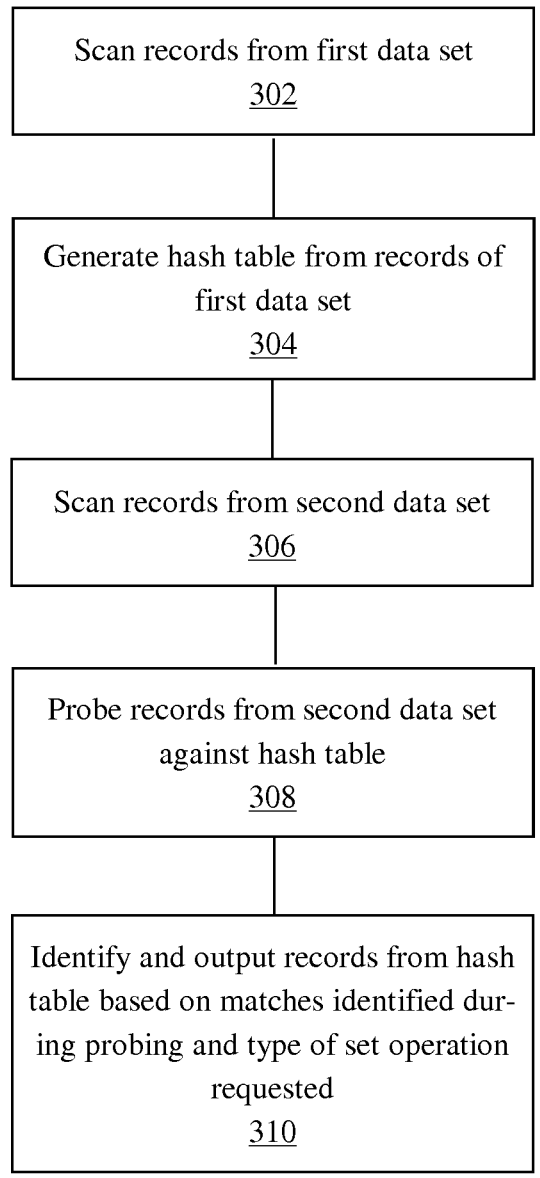
FIG. 3 is a flowchart depicting an example process for executing a set operation using a hash-based group by operation, according to an embodiment.

FIG. 3 is a flowchart depicting an example process for executing a set operation using a hash-based group by operation, according to an embodiment. In step 302, records from a first data set are scanned. Referring to the query depicted in Table 3, for instance, each record in the first data set is a row of data, scanned from table t1, that has a value (less than 5000) from the client_id column and a value from the client_name column.

In step 304, a hash table is built using the records from the first data set. During this step, a hash function is applied to each respective record in the first data set to generate mapping data that maps the respective record to a particular location in the hash table. For example, the hash function may receive values from the grouping keys—those columns involved in the set operation—of each record as input and output an index into the hash table. Records that have the same values in the grouping columns (duplicate records) map to the same location in the hash table. Records with different values may map to different locations in the hash table if there are no hash collisions. The first time a record maps to a particular location, it is stored in the hash table at the particular location (assuming there is no hash collision). When a duplicate record that maps to the same particular location is encountered, it is discarded such that duplicate records are eliminated and not stored in the hash table. For example, records with the same client_id and client_name value for the query depicted in Table 3 map to the same location in the hash table, but only one record is stored at that location to eliminate duplicates. Records with a different client_id and/or client_name value map to and are stored at different locations in the hash table. In some instances, there may be hash collisions where records with different values map to the same location in the hash table. In such scenarios, collision resolution may be performed to store records with different values at different locations within the hash table.

In step 306, records from the second data set are scanned. For the query depicted in Table 3, each record in the second data set is a row of data, scanned from table t2, that has a value (greater than 1000) from the company_id column and a value from the company_name column. In some embodiments, this step may be performed before step 304. A "union all" operation may be performed to combine the records of the first and second data set, such as depicted in query execution plan 220. In other embodiments, one or more of the steps may be performed, such as steps 302 and 306, in parallel. Thus, the term "step" as used herein is not intended to delineate any particular order.

In step 308, records from the second data set are probed against the hash table to identify matching records in the first and second data sets. During this step, the same hash function applied at step 304 is applied to the records of the second data set to generate mapping data that maps each respective record of the second data set to a particular location in the hash table. In contrast to step 304, however, the records of the second data set are not stored in the hash table. A match is determined when the record from the second data set maps to the same particular location as a record from the first data set. The records may be compared to ensure that there has not been a hash collision. With respect to the query depicted in Table 3, for example, the hash function is applied to the company_id and company_name value pair for each respective record in the second data to generate mapping data. Records from the second data set will map to the same particular location in the hash table as records from the first data set where the company_id and company_name values of records from the second data set match the client_id and client_name values, respectively, of records from the first data set. Records where the company_id and/or company_name values are different than the client_id and/or client_name values, respectively, map to different locations in the hash table and are not matches.

In step 310, records are identified and output from the hash table based on matches identified during probing and the type of set operation requested. For an INTERSECT operation, for example, the processing may proceed as follows. For each row in the second data set that is probed against the hash table, if there is a matching record from the first data set in the hash table, then the matching record of the first data set may be returned/output from the hash table and removed from the hash table. Removing records that match avoids subsequent comparisons if duplicate records exists in the second data set. The record may be output from the hash table as soon as a match between the first data set and the second data set is identified and before the probe phase (step 308) is complete. If a matching record from the first data set is not identified, then the record from the second data set is ignored. Records that are ignored are not output as part of the final result set. For a MINUS operation, the processing may proceed as follows. For each record in the second data set that is probed against the hash table, if there is a matching record from the first data set in the hash table, the record is removed from the hash table. Once probing is complete, the remaining records in the hash table are returned as results. Removing records from the hash table may include, without limitation, deleting the record from memory or marking the record as deleted in the hash table without physically deleting the record from the hash table. Outputting the records may include, without limitation, returning the remaining records to an application that requested the set operation, causing the remaining records to be displayed, providing the remaining records to a next operator in the query execution plan, and/or storing the remaining records in volatile or non-volatile storage.

Marker Addition for Data Set Differentiation

In some embodiments, a marker may be added to records involved in the set operation to differentiate records that belong to different data sets. For example, during processing of a set operation, different markers may be used to distinguish between records that belong to a first data set from records that belong to a second data set. Based on said differentiation, it may be determined whether set conditions specified by the set operation are satisfied.

A marker may comprise any data that identifies the data set to which a particular record belongs. For example, the marker may be a column that is added to the first data set and the second data set. A first value may be used for the marker that is added to each respective record in the first data set to indicate that the respective record belongs the first data set. Similarly, a second value, different than the first column value, may be used for the marker that is added to each respective record in the second data set to indicate that the respective record belongs to the second set and to differentiate records belonging to the second data set from records belonging to the first data set.

Figure 4:
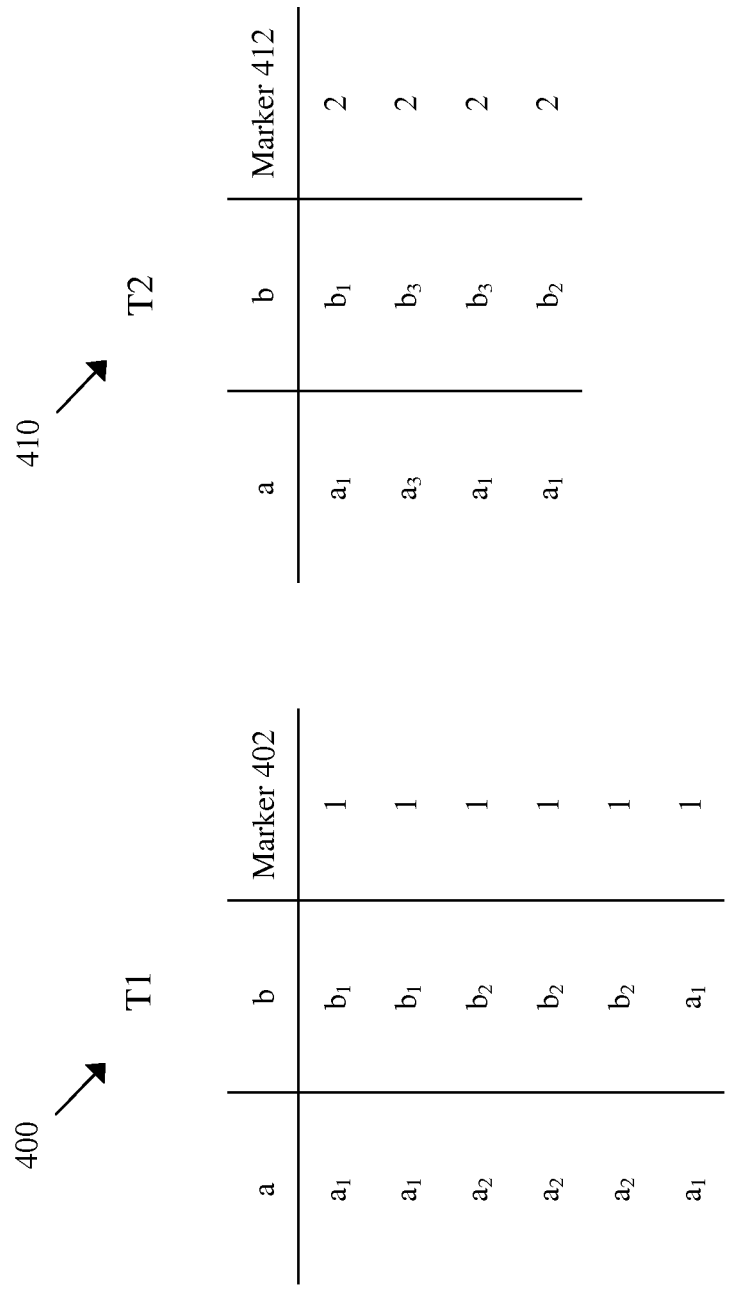
FIG. 4 is a diagram depicting example data sets that have had markers added during execution of a set operation, according to an embodiment.

FIG. 4 is a diagram depicting example data sets that have had markers added during execution of a set operation, according to an embodiment. Marker 402 is added to each respective record of data set 400 to indicate that the respective record belongs to data set 400. Similarly, marker 412 is added to each respective record of data set 410 to indicate that the respective record belongs to data set 412. Although the values "1" and "2" are used in the present example, the values may vary from implementation to implementation. For embodiments with only two data sets, the marker may store a binary value to minimize storage overhead.

Determining which records to output from the hash table may be based in part on the marker values that are stored for each respective record. For example, group-by operator 226 may determine whether the hash table is in the build phase (step 304) or probe phase (step 308) depending on the marker value of the records being processed. If group-by operator 226 is processing records with a first marker value indicating that the records belong to the first data set, then group-by operator 226 is in the build phase, and records with the first marker value are not removed from the hash table (although duplicates may be eliminated). If group-by operator 226 is processing records with a second marker value indicating that the records belong to the second data set, then group-by operator 226 is in the probe phase and matching records may be output/removed depending on the type of set operation requested.

Minimum and Maximum Marker Value Filter Conditions

In some embodiments, group-by operator 226 may perform aggregation using marker values from the first data set and/or second data sets to determine which records to output. A filter condition for outputting rows may be defined using the aggregate values based on the type of set operation requested. For example, each respective record in the first data set may be assigned a first marker value, and each respective record in the second data set may be assigned a second marker value that is greater than the first marker value. A filter condition may then be defined based on the minimum and maximum marker value aggregated for each record in the hash table and based on the type of set operation requested. Example filter conditions are provided below.

Figure 5:
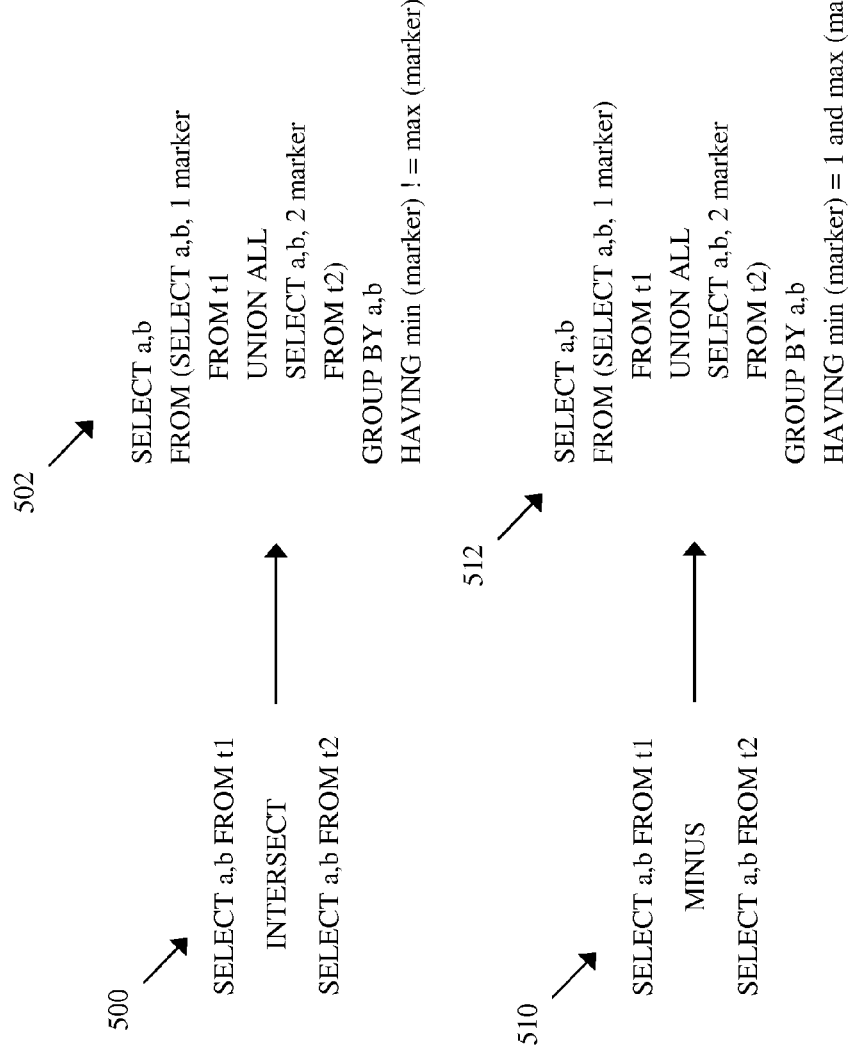
FIG. 5 is a diagram depicting an example logical representation of a query for performing a set operation, according to an embodiment.

FIG. 5 is a diagram depicting example logical representations of queries for performing set operations, according to an embodiment. Query 500 is a request to perform an INTERSECT operation, which may be rewritten as query 502. Query 502 adds a first marker with a value of "1" to each respective record in the first data set and a second marker with a value of "2" to each respective record in the second data set. Query 502 defines a filter condition that removes records where the minimum marker value and the maximum marker value are the same, keeping only those records where the minimum marker value and the maximum marker value are not equal. Records where the minimum marker value and the maximum marker value are not equal correspond to records that are included in both the first and second data sets. Therefore, these records are included in the final result set. Records where the minimum marker value and the maximum marker value are both equal to "1" correspond to records that are included only in the first data set, whereas records where the minimum marker value and the maximum marker value are both equal to "2" correspond to records that are included only in the second data set. Therefore, these records are not included in the final result set.

Query 510 is a request to perform an MINUS operation, which may be rewritten as query 512. Query 512 adds a first marker with a value of "1" to each respective record in the first data set and a second marker with a value of "2" to each respective record in the second data set. Query 512 defines a filter condition that removes records where the minimum marker value and the maximum marker value are not both equal to "1". When the hash table is built by the group-by operator, the minimum marker value and the maximum marker value are both set to "1". During the probe phase, if a record from the second data set maps to an entry in the hash table where a record from the first data set is stored, then the aggregation function changes the maximum marker value to "2". Records where the minimum marker value and the maximum marker value are both equal to "1" correspond to records that are included only in the first data set. Therefore, these records are included in the final result set. Records where the minimum and/or maximum marker value is equal to "2" correspond to records that are included in the second data set. Therefore, these records are not included in the final result set.

Figure 6:
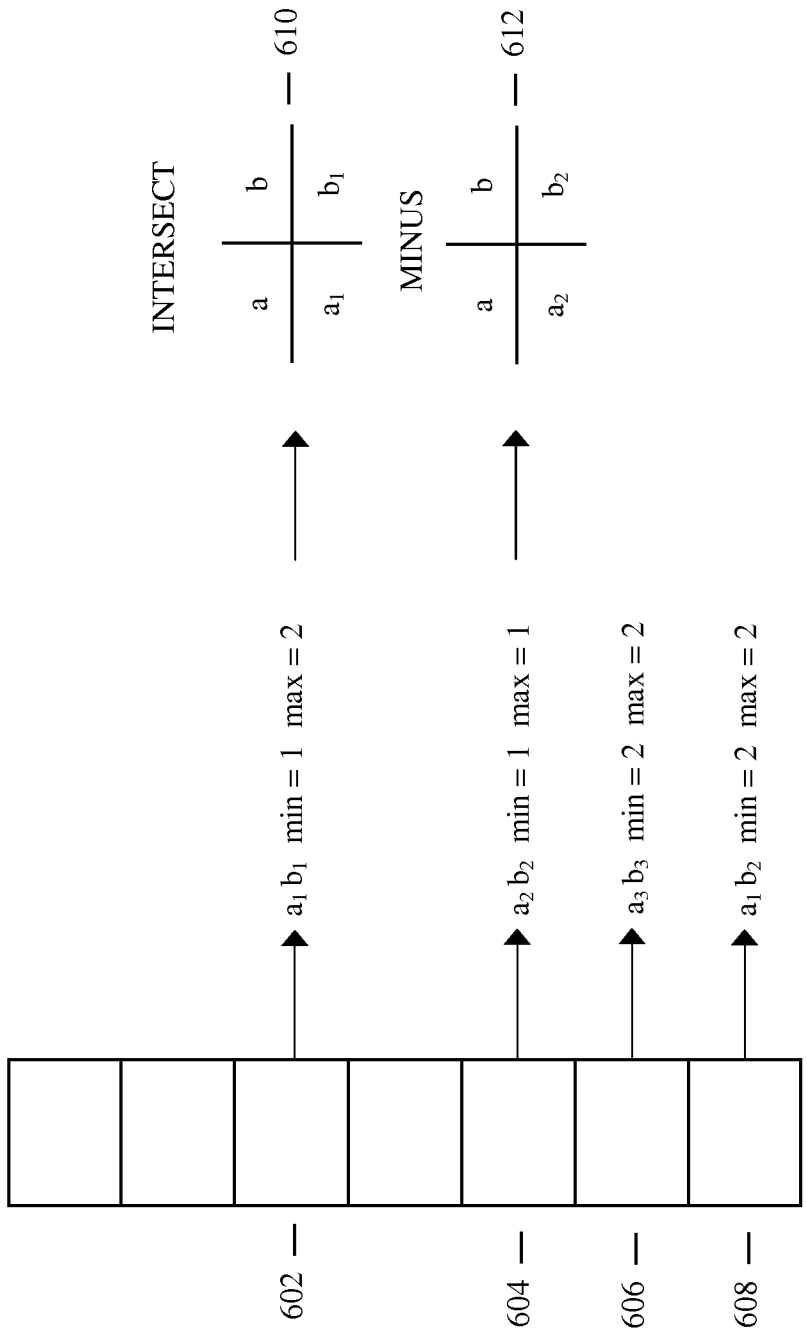
FIG. 6 is a diagram depicting an example of using marker values to identify which rows to output from a hash table, according to an embodiment.

FIG. 6 is a diagram depicting an example of using marker values to identify which rows to output from a hash table, according to an embodiment. Hash table 600 depicts an example of what a hash table might include after applying a hash function to data set 400 and data set 410, and performing aggregation with respect to the marker values. Entry 602 stores a record with column values $a_1$ and $b_1$, respectively. After aggregation, the minimum marker value is "1" and the maximum marker value is "2" since the record is included in both data sets 400 and 410. Entry 604 stores a record with column values $a_2$ and $b_2$, respectively. A minimum marker value of "1" and a maximum marker value of "1" is aggregated for entry 604 since the record is included only in data set 400 but not in data set 410. Entry 606 stores a record with column values $a_3$ and $b_3$, respectively. A minimum marker value of "2" and a maximum marker value of "2" is aggregated for entry 606 since the record is included only in data set 410 but not data set 400. Entry 608 stores a record with column values $a_3$ and $b_3$, respectively. A minimum marker value of "2" and a maximum marker value of "2" is aggregated for entry 606 since the record is included only in data set 410 but not data set 400. (Note: In embodiments where the probe phase does not create hash table entries, entries 606 and 608 would not exist since these records are only included in data set 410).

Result set 610 corresponds to the final result set for an INTERSECT operation and includes all records from hash table 600 where the minimum aggregated marker value does not equal the maximum aggregated marker value. Thus, the record stored at entry 602 is included, but the records stored at entries 604, 606, and 608 are not output. Result set 612 corresponds to the final result set of a MINUS operation and includes all records from hash table 600 where the minimum aggregated marker value and the maximum aggregated marker value are both equal to "1". Thus, the record stored at entry 604 is included, but the records stored at entries 602, 606, and 608 are not output.

In order to reduce processing overhead from aggregating marker values, aggregation may be bypassed during the build phase and performed only during the probe phase. For example, when processing records from data set 400 to add them to hash table 600, the minimum and maximum marker value is set to "1" the first time a record maps to a particular location in the hash table. When a duplicate record is processed from the first data set during the build phase, applying an aggregate function to determine a new minimum and maximum marker value would result in no change to the current minimum and maximum marker value. Therefore, instead of applying the aggregate function, aggregation may be bypassed such that no aggregation is performed, and the minimum and maximum marker valued remain at "1". During the probe phase, when a record from the data set is mapped to the same particular location in the hash table, the maximum marker value changes from "1" to "2". Therefore, the aggregate function is applied to effect the change. Once the aggregate function has been applied once, it may be bypassed for subsequent duplicate records during the probe phase, since applying the aggregate function for subsequent duplicate records would not change the state of the minimum and maximum marker values—these values would remain at '1' and "2" respectively.

Count-Based Marker Value Filter Conditions

In some embodiments, group-by operator 226 may aggregate count values for each record in the hash table. The count values may be used to determine if any and how many duplicates of the respective record exist in the first data set and the second data set. In addition or alternatively, the count values may be used to determine which records to output from the hash table. A filter condition for identifying and outputting rows may be defined using the count values based on the type of set operation requested.

Figure 7:
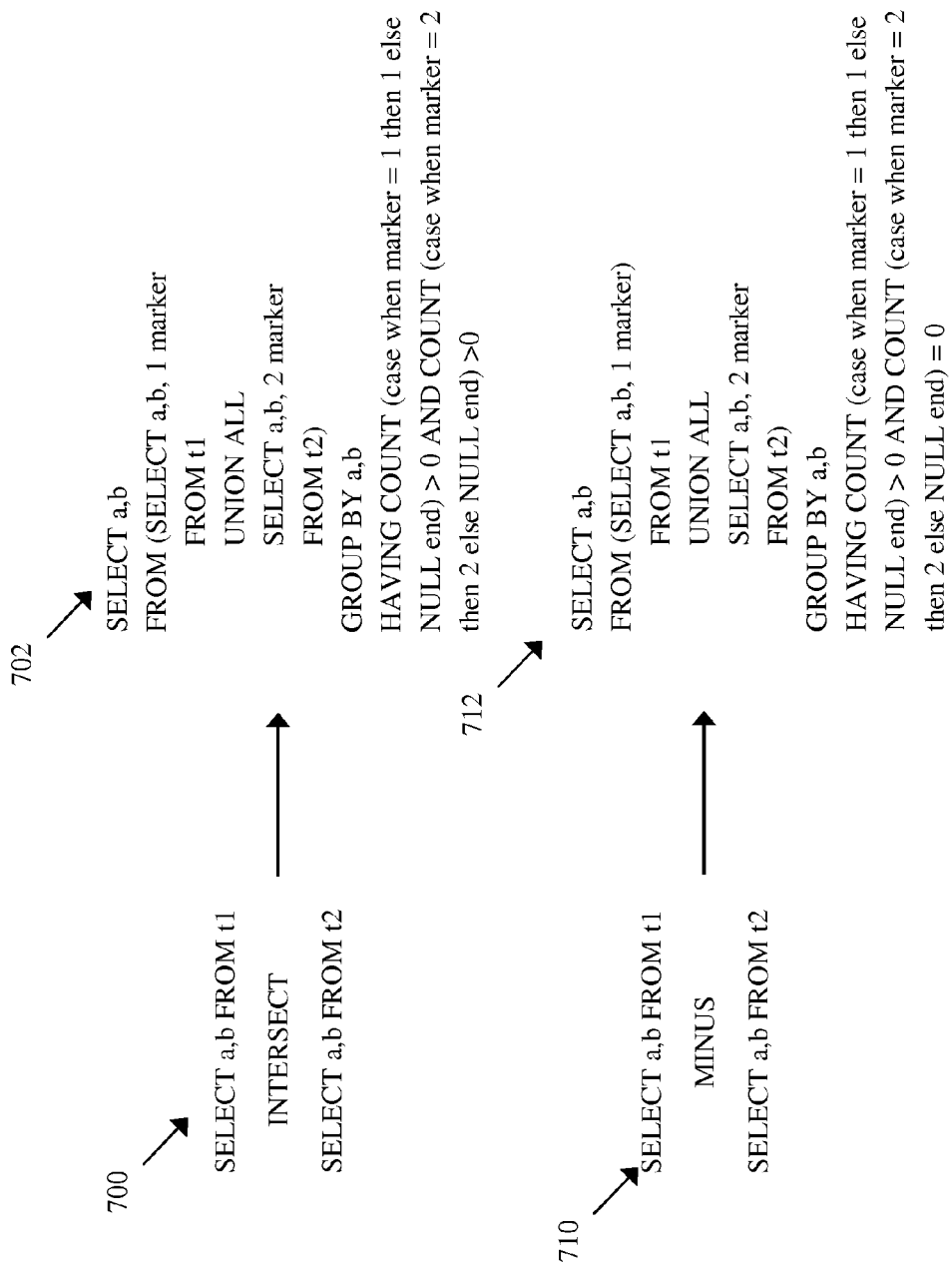
FIG. 7 is a diagram depicting an example logical representation of a query for performing a set operation, according to an embodiment.

FIG. 7 is a diagram depicting an example logical representation of a query for performing a set operation, according to an embodiment. Query 700 is a request to perform an INTERSECT operation, which may be rewritten as query 702. Query 702 aggregates a first count value that counts each duplicate record in the first data set (those records that map to the same location in the hash table) and a second count value that counts each duplicate record in the second data set. Query 702 defines a filter condition that outputs records from the hash table where the first and second count value are both greater than zero. (Instead of ">0", the expression "!=0" or ">=1" may be used in the HAVING condition depicted in query 702 with the same effect). Records where the first count value is zero corresponds to records that are not included in the first data set, whereas records where the second count value is zero correspond to records that are not included in the second data set. Therefore, these records are not included in the final result set for the INTERSECT operation. Records where both the first and second count values are greater than zero correspond to records that are included in both the first and second data sets. Therefore, these records are included in the final result set.

Query 710 is a request to perform an MINUS operation, which may be rewritten as query 712. Query 712 adds a first marker with a value of "1" to each respective record in the first data set and a second marker with a value of "2" to each respective record in the second data set. Query 712 defines a filter condition that outputs records where the first count value is greater than zero and the second count value is equal to zero. (Instead of ">0", the expression "!=0" or ">=1" may be used in the HAVING condition depicted in query 712 with the same effect). Records where the first count value is greater than zero and the second count value is equal to zero correspond to records that are included in the first data set, but not included in the second data set. Therefore, these records are output as the final result.

Although only an INTERSECT and MINUS operation is depicted in FIG. 7, the count values may also be used to process a request to perform an INTERSECT ALL operation or a MINUS ALL operation. For example, when an INTERSECT ALL operation is received a first count value may be aggregated for each respective record in a hash table to determine if any and how many duplicates of the respective record exist in the first data set. Similarly, a second count value may be aggregated for each respective record in a hash table to determine if any and how many duplicates of the respective record exist in the second data set. When generating the final result set, if both the first count value and the second count value are greater than one for a particular record in the hash table, then the result set may be generated to include the appropriate number of duplicate records as indicated by the count values. The number of records included in the final result set is the minimum of the first count value and the second count value. For instance, if the first count value is "4" and the second count value is "2", then two duplicate records are included in the final result set.

When a MINUS ALL operation is received, the final result set includes a number of records corresponding to the first count value minus the second count value, where the first count value minus the second count value is a positive integer. For example, if the first count value is "5" and the second count value is "2", then three duplicate records are included in the final result set.

Figure 8:
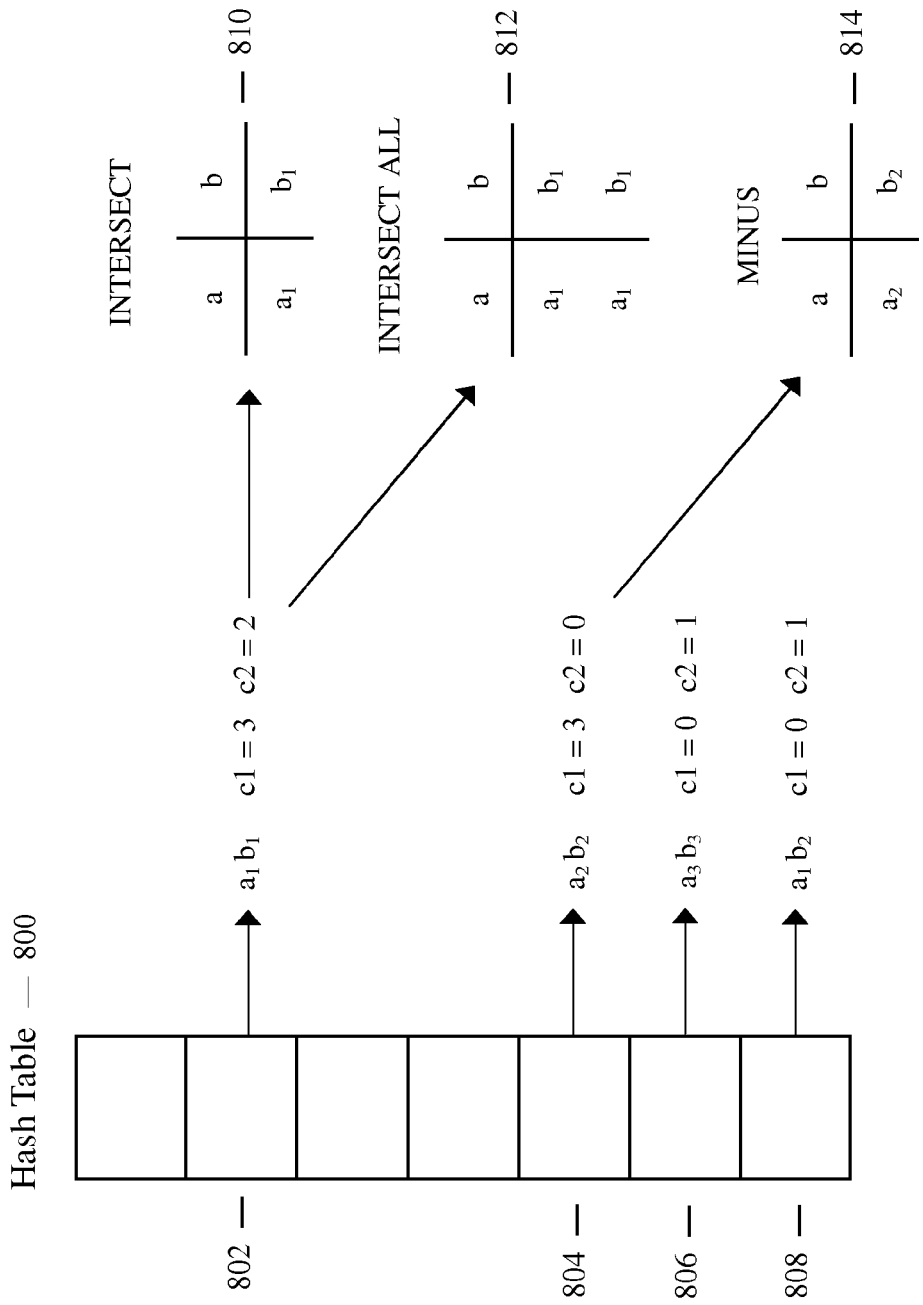
FIG. 8 is a diagram depicting an example of using marker values to identify which rows to output from a hash table, according to an embodiment.

FIG. 8 is a diagram depicting an example of using marker values to identify which rows to output from a hash table, according to an embodiment. Hash table 800 depicts an example of what a hash table might include after applying a hash function to data set 400 and data set 410, and performing aggregation with respect to the count values. Entry 802 stores a record with column values $a_1$ and $b_1$, respectively. Entry 802 further stores an aggregate count value c1 indicating the number of records from data set 400 that were mapped to entry 802 by the hash function, and an aggregate count value c2 indicating the number of records from data set 410 that were mapped to entry 802 by the hash function. Similarly, entries 804, 806, and 808 each store a record with aggregate count values c1 and c2 indicating the number of records from data set 400 and data set 410, respectively, that were mapped to the respective entry in hash table 800. (Note: In embodiments where the probe phase does not create hash table entries, entries 806 and 808 would not exist since these records are only included in data set 410).

Result set 810 corresponds to the final result set for an INTERSECT operation and includes all records from hash table 800 where both c1 and c2 are not equal to zero. Thus, the record stored at entry 802 is included, but the records stored at entries 804, 806, and 808 are not output. Result set 812 corresponds to the final result set of an INTERSECT ALL operation. The INTERSECT ALL operation returns duplicate records based on the c1 and c2 values, when both values are greater than one for a particular entry in hash table 800, by determining the minimum of the c1 and c2 values, which corresponds to the number of duplicates returned. Thus, result set 812 returns two records from entry 802 since the value of c2 is "2", which is less than the value of c1. Result set 814 corresponds to the final result set for a MINUS operation and includes all records from hash table 800 where the minimum aggregated marker value and the maximum aggregated marker value are both equal to "1". Thus, the record stored at entry 604 is included, but the records stored at entries 602, 606, and 608 are not output.

Hash Partitioning

In some cases, the first and second data sets may be so large that some of the records are spilled to disk during scanning. In such cases, hash partitioning may be used to distribute scanned data for processing by group-by operator 226. Hash partitioning maps records that are scanned from the first and second data sets to partitions based on a hash function that is applied to the group-by keys. The hash function may evenly distribute records among a plurality of partitions, giving each respective partition of the plurality of partitions approximately the same size. This allows group-by operator 226 to process data in smaller chunks, one or more partitions at a time, depending on available memory.

Within each partition of the plurality of partitions, metadata may be maintained to find boundaries between the first data set and second data set. For example, a marker value may be maintained at the beginning of each partition that identifies a position, such as a byte or a bit offset, within the partition where rows from the first data set end and rows from the second data set begin. This metadata may be used to determine whether group-by operator 226 is in the build phase or the probe phase for a given partition.

During processing by group-by operator 226, the hash table may be distributed across the plurality of partitions, with a first portion of the hash table stored in memory and a second portion of the hash table stored on disk. For example, a first set of one or more partitions may be read into memory and processed by group-by operator 226 to generate a portion of the result set. While processing the first set of one or more partitions, a second set of one or more partitions may be stored on disk. After processing, group-by operator 226 may read one or more partitions from the second set for processing. Thus, group-by operator 226 may process records from the first and second data set and generate the final result set on a per-partition basis.

Database Systems

According to one embodiment, the techniques described herein are implemented by a DBMS. A DBMS is a set of processes used to manage a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database object such as a tablespace or a segment may be assigned to a particular storage tier. A storage tier denotes a particular balance between access speed and storage cost. Each storage tier may represent a different type or quality of storage medium. In general, as the access speed of a storage medium increases the price to purchase that storage medium tends to increase as well. As a result, many businesses have a limited amount of premium storage space with the fastest access speed and a much larger amount of secondary or tertiary storage space which is slower, but cheaper to purchase in bulk. Thus, in order to maximize the performance of a DBMS, data with higher operational relevance can be placed on faster storage mediums, such as top-quality disk drives, while data with lesser operational relevance can be placed on slower storage mediums, such as optical disks or tape drives.

Each storage tier may also represent a storage area where the data is compressed using a different technique. Similar to the choice of storage medium, each compression technique also represents a tradeoff, in this case between access speed and storage space. More specifically, compression techniques that achieve higher compression ratios also tend to take longer to decompress when accessing the data. Thus, in order to maximize the performance of a database management system, data with higher operational relevance can be stored uncompressed to allow faster access, while data with lower operational relevance can be compressed to save space. Storage tiers may represent a combination of both storage medium and the technique used to compress or store data on the storage medium.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
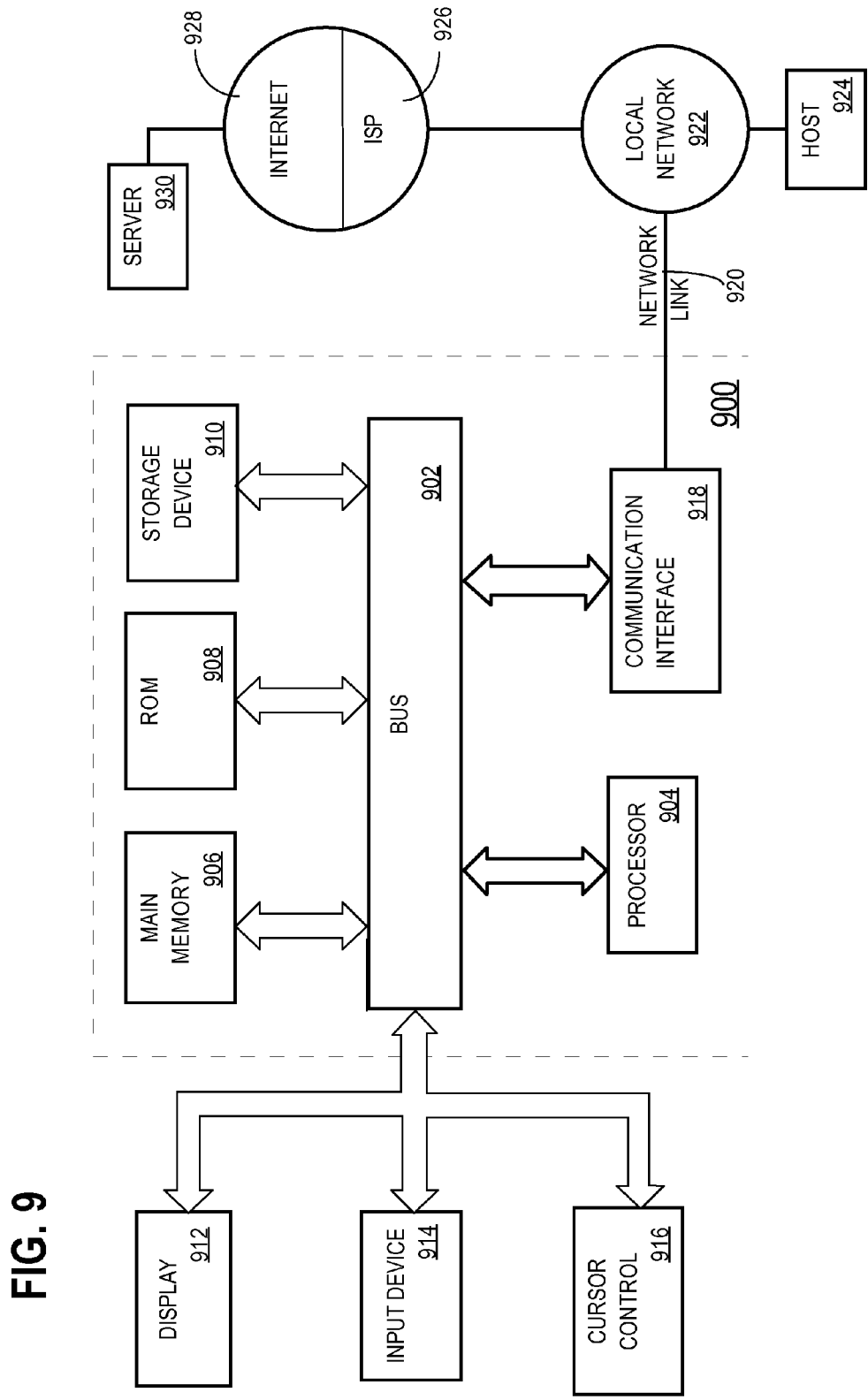
FIG. 9 is a block diagram depicting a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for performing a set operation using one or more computing devices, the method comprising:
   receiving a request to perform a set operation, wherein the request identifies one or more grouping keys and a set operator indicating how to combine a first data set with a second data set;

storing first entries corresponding to the first data set in a hash table based on the one or more grouping keys, each first entry comprising at least a portion of a record in the first data set;

probing records from the second data set against the hash table based on the one or more grouping keys to identify matching records from the second data set, each matching record matching a first entry of the first entries corresponding to the first data set;

identifying and outputting records that satisfy the set operation based on the first entries in the hash table and the matching records identified.

2. The method of claim 1, further comprising:

associating a first marker with records from the first data set;

associating a second marker with records from the second data set;

using the first marker and the second marker, differentiating between records from the first data set and records from the second data set while generating and probing the hash table;

wherein identifying and outputting records that satisfy the set operation is based on using the first maker and the second marker to differentiate between first entries corresponding to records in the first data set and second entries corresponding to records in the second data set.

3. The method of claim 2, further comprising:

determining a minimum value and a maximum value for each record in the hash table based on the first marker and the second marker;

wherein identifying and outputting records that satisfy the set operation comprises performing one of:
  removing records from a final result set where the minimum value does not equal the maximum value when the set operation is a minus operation; or
  outputting records where the minimum value does not equal the maximum value when the set operation is an intersect operation.

4. The method of claim 1, wherein identifying and outputting records comprise:

adding or removing entries from the hash table based on the set operation requested;

wherein, for one or more first types of set operation requested, second entries comprising at least a portion of a record in the second data set are added to the hash table;

wherein, for one or more second types of set operation requested, first entries are removed from the hash table based on matching records from the second data set;

wherein records that satisfy the set operation comprise remaining entries in the hash table.

5. The method of claim 1, wherein identifying and outputting records from the hash table comprises:

determining, from the set operator, that the set operation is an intersect operation;

in response to determining that the set operation is an intersect operation, outputting records that satisfy the set operation based on the matching records identified based on said probing.

6. The method of claim 1, wherein identifying and outputting records from the hash table comprises:

determining, from the set operator, that the set operation is a minus operation;

in response to determining that the set operation is a minus operation, removing records from a final result set based on the matching records identified based on said probing.

7. The method of claim 1, further comprising:

wherein storing the first entries comprises storing, for one or more first entries in the hash table, a first count value that indicates if any and how many duplicates of a respective record exist in the first data set;

wherein modifying the hash table comprises storing, for one or more entries in the hash table, a second count value that indicates if any and how many duplicates of a respective record exist in the second data set;

wherein identifying and outputting records that satisfy the set operation is further based on the first count value and the second count value.

8. The method of claim 1, further comprising:

in response to determining that the set operation is an intersect all or a minus all operation:
  aggregating, for entries in the hash table, a first count value that indicates if any and how many duplicates of a respective record exist in the first data set;
  aggregating, for entries in the hash table, a second count value that indicates if any and how many duplicates of a respective record exist in the second data set;

wherein identifying and outputting records from the hash table comprises:
  outputting duplicate records for at least one entry in the hash table based on the first count value and the second count value associated with the at least one entry.

9. The method of claim 1, further comprising:

in response to receiving the request to perform the set operation with respect to the first data set and the second data set, generating a query execution plan that includes a group-by operation;

wherein the group-by operation is the only operation in the query execution plan that performs a comparison of records from the first Get of data set and the second data set before an operation for outputting records that satisfy the set operation.

10. The method of claim 1, wherein a portion of the hash table is stored on disk, the method further comprising:

generating a plurality of partitions for the hash table based on the first data set and the second data set identified in the request;

wherein a first set of one or more partitions of the plurality of partitions is stored in memory of the one or more computing devices;

wherein a second set of one or more partitions of the plurality of partitions is stored on disk;

wherein the first set of one or more partitions is different than the second set of one or more partitions.

11. One or more non-transitory computer-readable media storing instructions, which, when executed by one or more processors, cause:

receiving a request to perform a set operation, wherein the request identifies one or more grouping keys and a set operator indicating how to combine a first data set with a second data set;

storing first entries corresponding to the first data set in a hash table based on the one or more grouping keys, each first entry comprising at least a portion of a record in the first data set;

probing records from the second data set against the hash table based on the one or more grouping keys to identify matching records from the second data set, each matching record matching a first entry of the first entries corresponding to the first data set;

identifying and outputting records that satisfy the set operation based on the first entries in the hash table and the matching records identified.

12. The one or more non-transitory computer-readable media of claim 11, further storing instructions, which, when executed by the one or more processors, cause:
associating a first marker with records from the first data set;
associating a second marker with records from the second data set;
wherein identifying and outputting records that satisfy the set operation is based on using the first marker and the second marker to differentiate between first entries corresponding to records in the first data set and second entries corresponding to records in the second data set.

13. The one or more non-transitory computer-readable media of claim 12, further storing instructions, which, when executed by the one or more processors, cause:
determining a minimum value and a maximum value for each record in the hash table based on the first marker and the second marker;
wherein identifying and outputting records that satisfy the set operation comprises performing one of:
removing records from a final result set where the minimum value does not equal the maximum value when the set operation is a minus operation; or
outputting records where the minimum value does not equal the maximum value when the set operation is an intersect operation.

14. The one or more non-transitory computer-readable media of claim 12, further storing instructions, which, when executed by the one or more processors, cause:
in response to determining that the set operation is an intersect all or minus all operation:
aggregating, for entries in the hash table, a first count value that indicates if any and how many duplicates of a respective record exist in the first data set;
aggregating, for entries in the hash table, a second count value that indicates if any and how many duplicates of a respective record exist in the second data set;
wherein instructions for identifying and outputting records from the hash table comprise instructions for:
outputting duplicate records for at least one entry in the hash table based on the first count value and the second count value associated with the at least one entry.

15. The one or more non-transitory computer-readable media of claim 12, further storing instructions, which, when executed by the one or more processors, cause:
in response to receiving the request to perform the set operation with respect to the first data set and the second data set, generating a query execution plan that includes a group-by operation;
wherein the group-by operation is the only operation in the query execution plan that performs a comparison of records from the first data set and the second data set data before an operation for outputting records that satisfy the set operation.

16. The one or more non-transitory computer-readable media of claim 12, wherein a portion of the hash table is stored on disk, the one or more non-transitory computer-readable media further storing instructions, which, when executed by the one or more processors, cause:
generating a plurality of partitions for the hash table based on the first data set and the second data set identified in the request;
wherein a first set of one or more partitions of the plurality of partitions is stored in memory of the one or more computing devices;
wherein a second set of one or more partitions of the plurality of partitions is stored on disk;
wherein the first set of one or more partitions is different than the second set of one or more partitions.

17. The one or more non-transitory computer-readable media of claim 11, wherein identifying and outputting records comprise:
adding or removing entries from the hash table based on the set operation requested;
wherein, for one or more first types of set operation requested, second entries comprising at least a portion of a record in the second data set are added to the hash table;
wherein, for one or more second types of set operation requested, first entries are removed from the hash table based on matching records from the second data set;
wherein records that satisfy the set operation comprise remaining entries in the hash table.

18. The one or more non-transitory computer-readable media of claim 11, wherein instructions for removing records from the hash table comprise instructions for:
determining, from the set operator, that the set operation is an intersect operation;
in response to determining that the set operation is an intersect operation, outputting records that satisfy the set operation based on the matching records identified based on said probing.

19. The one or more non-transitory computer-readable media of claim 11, wherein instructions for identifying and outputting records from the hash table comprise instructions for:
determining, from the set operator, that the set operation is a minus operation;
in response to determining that the set operation is a minus operation, removing records from a final result set based on the matching records identified based on said probing.

20. The one or more non-transitory computer-readable media of claim 11, further storing instructions, which, when executed by the one or more processors, cause:
wherein storing the first entries comprises storing, for one or more first entries in the hash table, a first count value that indicates if any and how many duplicates of a respective record exist in the first data set;
wherein modifying the hash table comprises storing, for one or more entries in the hash table, a second count value that indicates if any and how many duplicates of a respective record exist in the second data set;
wherein instructions for identifying and outputting records that satisfy the set operation is further based on the first count value and the second count value.

\* \* \* \* \*

UNITED STATES PATENT AND TRADEMARK OFFICE
CERTIFICATE OF CORRECTION

PATENT NO. : 9,535,956 B2  
APPLICATION NO. : 14/170392  
DATED : January 3, 2017  
INVENTOR(S) : Bellamkonda Page 1 of 1

It is certified that error appears in the above-identified patent and that said Letters Patent is hereby corrected as shown below:

In Column 17, Line 23, in Claim 2, delete "maker" and insert -- marker --, therefor.

In Column 18, Line 37, in Claim 9, after "first" delete "Get of".

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*